United States Patent [19]

Thieme et al.

[11] 4,224,281

[45] Sep. 23, 1980

[54] DOSAGING DEVICE FOR LIQUID MEDIA

[75] Inventors: Roland Thieme, Maximiliansau, Fed. Rep. of Germany; Guido Heyneman, Knokke, Belgium

[73] Assignee: Siemens Aktiengesellschaft, Berlin & Munich, Fed. Rep. of Germany

[21] Appl. No.: 4,372

[22] Filed: Jan. 18, 1979

[30] Foreign Application Priority Data

Feb. 1, 1978 [DE] Fed. Rep. of Germany ....... 2804316

[51] Int. Cl.[2] ............................................. G01N 1/14

[52] U.S. Cl. .................................... 422/100; 422/103; 73/425.4 R; 73/425.6; 222/52; 222/71

[58] Field of Search .............................. 422/100, 103; 73/425.4 R, 425.6; 222/14, 71, 52

[56] References Cited

U.S. PATENT DOCUMENTS

| | | | |
|---|---|---|---|
| 3,222,135 | 12/1965 | Ashmead | 422/103 X |
| 3,421,858 | 1/1969 | Quinn | 422/103 |
| 3,800,984 | 2/1974 | Phelan | 422/100 |
| 3,805,998 | 4/1974 | Croslin | 422/100 |
| 3,864,978 | 2/1975 | Stephens | 422/103 |
| 3,913,899 | 10/1975 | Van der Sluys et al. | 422/103 |
| 4,070,156 | 1/1978 | Moran et al. | 73/425.6 |

*Primary Examiner*—R. E. Serwin

*Attorney, Agent, or Firm*—Hill, Van Santen, Steadman, Chiara & Simpson

[57] ABSTRACT

A multiple liquid metering device of the type used in liquid analysis assemblies includes a valve block having an intermediate liquids storage vessel and a moving piston measurement burette. The valve block is provided with a plurality of inlet and outlet nozzles each of which is independently controlled by a valve. Internal passageways in the valve block allow the inlet nozzles to be selectively placed in communication with the burette and the burette to be selectively placed in communication with the intermediate receptacle. Stroke length of the piston and the burette is controlled by a program generator via a piston rod carried perforated disc supplying counting pulses to the program generator in response to activation of the piston motor to move the piston.

16 Claims, 4 Drawing Figures

DOSAGING DEVICE FOR LIQUID MEDIA

BACKGROUND OF THE INVENTION

1. Field of the Invention

This invention relates to liquid measuring and metering devices and particularly to liquid dosaging devices.

2. Prior Art

In general, this invention is directed to a liquid metering or dosage device which includes an intermediate receptacle in communication with the valve block and a piston controlled burette also in communication with the valve block with means to provide a flow of fluid of a prescribed amount from the burette to the receptacle.

Such devices are used for precise portioning and delivering of liquids such as samples, reagents, etc. from liquid storage vessels to a further utilization vessel such as, for example, a reaction vessel. It has been known to utilize and automatically operated burette for precise liquid supply measurement with the burette having a variable stroke piston. (See for example, German Offenlegungsschrift No. 2,448,353). In such devices the measured liquid being ejected from the burette is conveyed to the receiving receptacle through a tube or hose line controlled by a valve block. Such device are disadvantageous for a number of reasons. The tube lines used constitute a large dead volume depending upon the tube diameter and length. Although such prior devices have attempted to maintain the dead volume as low as possible, this is not always achievable in such devices. Moreover, if it is desired to measure and inject into the receptacle a number of different liquids, separate burettes having separate liquid inlets and outlets are to be utilized. Thus, such setups can become quite expensive both in regards to material and time. For these reasons, such installations as automatically operated analysis apparatus are not economically and efficiently producable utilizing the prior art dosaging devices.

SUMMARY OF THE INVENTION

It is therefore a principal object of this invention to provide a dosaging device for liquids capable of being utilized in automatic operations such as, for example, automatic water analysis apparatus. The desired device is to be economically designed with respect to the volume occupied by it and the dead volume contained in its various lines. Moreover, it is an object of this invention to provide a device capable of successively delivering different liquids to an intermediate receptacle while using a single burette and which is automatically operated in a simpler manner.

Accordingly, the invention improves upon the prior art by providing: (a) a plurality of inlet nozzles and at least one outlet nozzle arranged in a common valve block with channeling means whereby the inlet nozzles can respectively be connected to the burette via a valve and the burette can be selectively connected to the receiving device via a passageway provided with a feed and/or drain valve, (b) the receptacle receiving liquid from the burette is mounted on the valve block thereby minimizing passageway lengths, and (c) the stroke magnitude of the burette piston is controllable according to a selected program.

By means of the above design perameters, a dosage device is easily constructable in a manner which makes economical usage of volume. By providing automatic control of the valves of the valve block and of the piston stroke of the burette, the admixture supplied to the receptacle (which may consist of the sample liquid, one or more buffer solutions, one or more reagents, etc.) is assembled immediately adjacent the burette. Thereafter, at a desired point in time, preselected by a program generator, the liquid admixture stored in the device's receptacle can be fed to a further utilizer as a reactor vessel.

The dosage device according to this invention may be operated, for example, in such a manner that a sample liquid is first fed into the receptacle by means of a first proportioned piston stroke in the burette upon the opening of a first inlet valve. Subsequently, a predetermined amount of a buffer solution can be fed to the receptacle upon the opening of a second inlet valve and reciprocation of the piston for a second stroke of predetermined length. Subsequent operation steps utilizing a third valve and a third determined piston stroke can add other liquids, for example, a reagent, to the receptacle. Upon completion of the desired admixture in the receptacle, a reversing outlet valve can be activated and the liquid contained in the receptacle forced from the dosage device to a further device such as, for example, reactor vessel through an outlet nozzle. The admixture can be expelled from the receptacle by means such as compressed air.

To this end, the valve block is designed as a distributor head and is equipped with a plurality of valves which may be equal angularly spaced about a central axis. The valves are of the type which can be operated independently of one another. A first passageway is positioned axially of the valve block and is in communication with the burette. The first passageway indexes with a plurality of valve controlled passageways in, for example, a spoke pattern. Additionally, a second axial passageway is provided in the valve block connected to the first axial passageway by means of one of the valves. The second axial passageway communicates to the receptacle.

In the preferred design the receptacle has a cap remote from the valve block which is in communication with a compressed air source so as to provide compressed air to the interior of the receptacle. When the burette piston is in its full up position it presses against the valve block and closes the first axial passageway. At that time, if the outlet valve is in its open position, the compressed air will cause the liquid in the receptacle to flow from the dosage assembly with the liquid and compressed air flowing, respectively to the atmosphere or to a reactor vessel.

In order to precisely apportion the volumes of liquid being provided to the receptacle, and therefore in order to control the stroke height of the burette piston, the piston motor is provided with a perforated disc which cooperates with a sensor such as light optical signal generator providing an input to a program generator. Thus, movement in increments of the piston can be effectively counter by the perforated disc and the light optical signal generator in such a manner that the program generator can terminate movement of the piston in accordance with the counting rate preset within the program generator. Through the utilization of the closable valves and a return stroke of the piston, the metered liquid can then be flowed precisely to the receptacle.

In the preferred embodiment the burette is placed at the bottom of the valve block with the receptacle on the top of the valve block. The inlet and outlet nozzles are placed around the periphery of the valve block having passageways to a plurality of circumferentially spaced valves. The valves communicate the inlet and outlet nozzles to radially extending passageways which in turn communicate to an axial extending passageway to the burette. One of the radially extending passageways communicates to a valve chamber which is openable to a second radially directed passageway which in turn communicates to a second axial passageway open to the receptacle. The motor for driving the piston is preferably positioned under the burette with the piston rod extending away from the valve head. The sensor may be positioned on the opposite side of the motor.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
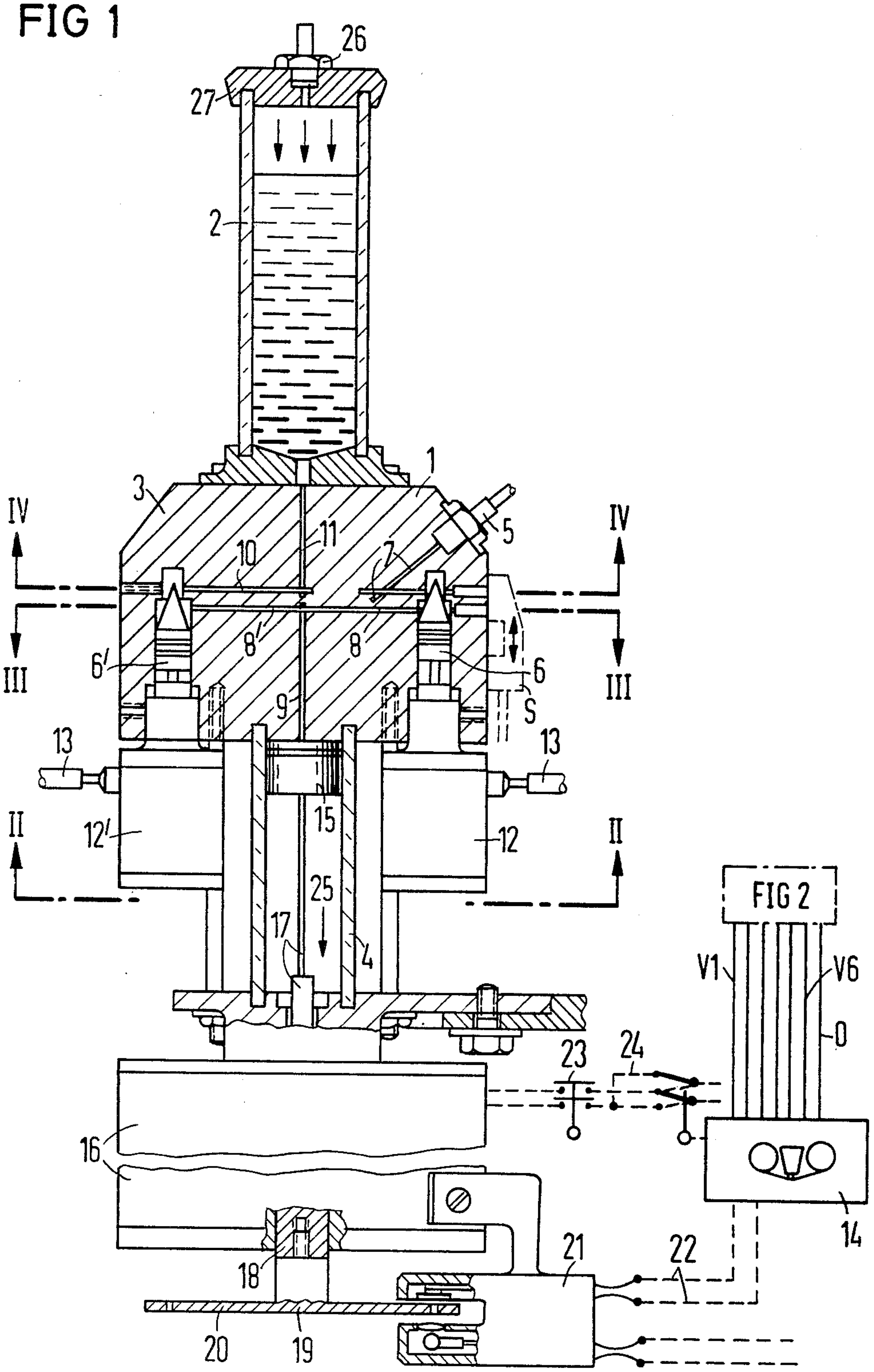
FIG. 1 is a side view partially in section of the metering or dosaging device of this invention.

As shown in FIG. 1, the metering or dosaging device, generally referred to at 1, includes a receptacle 2, a valve block 3, a burette 4 equipped with a piston 15 and a drive motor 16. A plurality of inlet and/or outlet nozzles 5 are arranged around the periphery of the block. In the view illustrated in FIG. 1, only one such nozzle 5 is shown. The valve block 3 is provided with a plurality of individually controlled valves 6, 6'. The inlet and outlet nozzles 5 are communicated with the burette 4 by means of internal valved passageways 7, 8 and 9 when one or more of the valves 6 are open. Furthermore, passageway 8' communicates with the chamber of valve 6' and thus communicates the burette 4 to the receptacle 2 via passageways 9, 8', 10 and 11.

It is to be understood that the valves illustrated at 6 and 6', although being needle valves could, if desired, be slide valves as shown at S in broken lines. The valves are pneumatically driven by cylinders 12 controlled by valves 28 shown schematically in FIG. 2. The valves 28 are controlled from a programmable central control 14. Compressed air lines 13 communicate the individual actuator valves 28 to the individual needle valves 6, 6'.

In the needle valves shown, the compressed air preferably works against a spring loaded piston such that the valves 6, 6' are normally closed valves and are openable only under positive pressure from the valves 28.

The piston 15 of the burette 4 is preferably operated by an electric motor 16. The motor may be a rotating motor driving a worm gear spindle with a gear follower on the piston rod 17. In this manner, a specific number of revolutions of the motor will correspond to a specific stroke distance of the piston. The motor is a reversable motor and has a main shaft 18 extending from a bottom thereof which is equipped with a disc 9 having a plurality of axially extending equa-distantly circumferentially spaced bores. The disc is positioned in juxtaposition to an optical signal generator 21 which provides an input via lines 22 to the control 14. Switches, 23, 24, operated under the influence of the control 14, determine the rotational direction of the motor 16 thereby controlling the movement of the piston 15 in both a suction and a feed direction.

For example, if it is desired to feed a predetermined amount of liquid to the receptacle 2, the valve 6' is closed while the valve 6 is open. The piston 15, is, at that point, at its upper end position where its axial front end surface seals passageway 9. By means of the control 14, the piston is caused to move downward in the direction of arrow 25 by a distance corresponding to a specific desired liquid volume measurement. This is determined by means of the input of a predetermined number of counting signals from the sensor 21 to the controller, each signal being generated by a proportional rotation of the plate 19 in a manner known to the art. Thus, the burette 4 will have its area above the piston filled with the predetermined liquid volume. When the predetermined number of impulses from the sensor 21 has been inputed to the control 14, actuation of the motor will be terminated, the valve 6 be closed and the valve 6' be opened. At that time reversal of direction of the rotation of the motor causes an upward movement of the piston opposite the arrow 25 to the end that the liquid then contained in the burette will be forced via passageways 9, 8', 10 and 11 to the receptacle 2. When the piston 15 has again been moved to its full up position, rotation of the motor will be stopped and valve 6' closed.

Thereafter, additional liquids from additional sources may be provided by repeating the above sequence actuating initially different valves 6 connected to different inlet nozzles 5.

Upon the measurement of all of the liquid components of the desired admixture and the feeding of those measured liquid components to the receptacle 2, valve 6' is again opened and one of the valves 6 associated with the outlet nozzle 5 is also opened. Simultaneously the air pressure is applied via cap 27 of the receptacle 2 through inlet 26 to force the liquid from the receptacle 2 via channels 11, 10, 8' and the then opened selected set of passageway 8 and 7 to the outlet nozzle 5, it being understood that the plurality of nozzle assemblies 5 are substantially equivalent in that each contains a first passageway in communication with the nozzle, herein designated 7, and which also contains a second passageway, herein also identified as 7, in communication with the valve chamber. The individual nozzle assemblies each have communication from their associated valve chamber through one of the radial passageways 8. As shown in phantom on FIG. 1, in place of the needle valve 6 a slide valve S is equally well usable.

Figure 2:
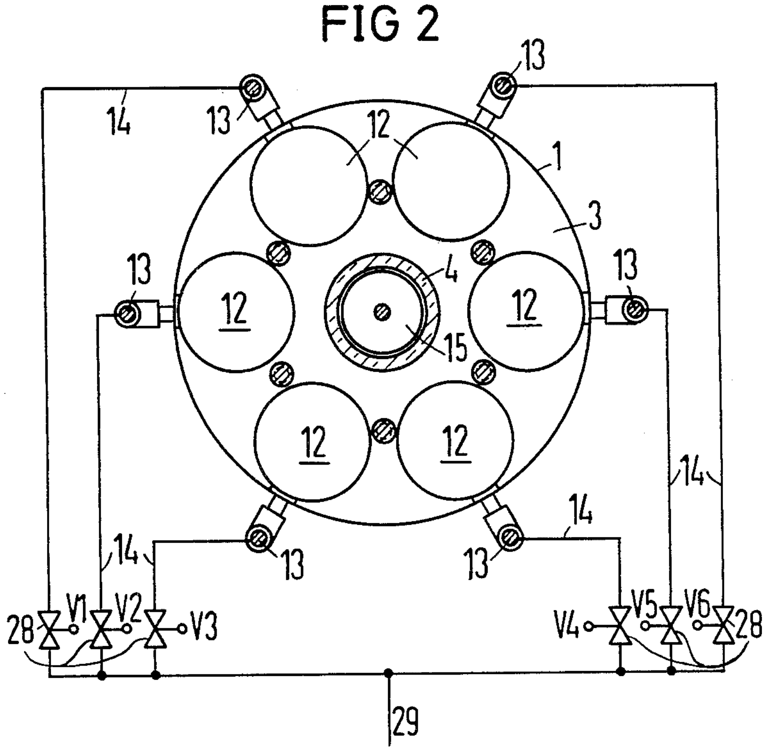
FIG. 2 is a sectional view taken along the lines II—II of FIG. 1.

FIG. 2 is a sectional view taken along the lines II—II of FIG. 1 and illustrates a valve head having six individual valves. Shown schematically therein each of the valve actuators 12 has an associated compressed air intake 13 which is in communication with one of the valves 28 via lines 14, the valves 28 being further in communication with the compressed air source via line 29.

The individual valves 28 are controlled from the central control 14 via control lines VI through V6. Preferably valves 28 are designed such that, when in a closed or unactivated position, the lines 14 are vented to the atmosphere. In this manner, as mentioned above, the individual valves 6 will be in a closed state due to the return pressure spring in the valve actuator 12.

Figure 3:
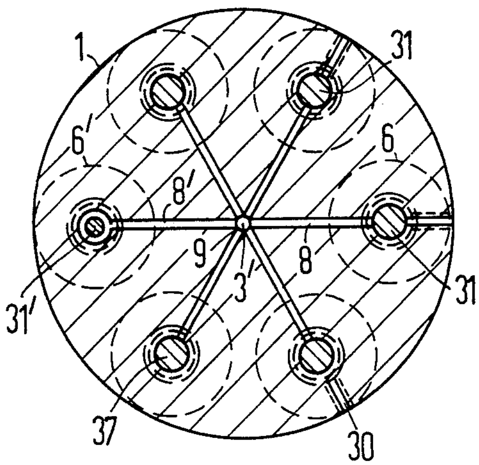
FIG. 3 is a sectional view taken along the lines III—III of FIG. 1 showing a section of the valve head.

FIG. 3 illustrates a first axially positioned cross section radially of the valve block 3 along lines III—III. The axial bore 9 shown in FIG. 1 is positioned along the central axis 3' and communicates in spoke shape through radiating passageways 8, 8' to the valve chambers of the needles 30 or 31' of the needle valves. Each of the radial passageways may be formed from the outer periphery and be closed by the aid of pins or set screws 30. In the drawing all of the needles 31 of the valves 6 are closed except for the needle 31 of valve 6'.

Figure 4:
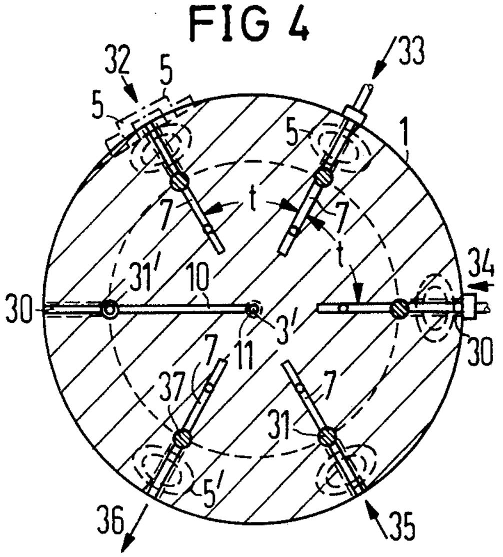
FIG. 4 is a view similar to FIG. 3 taken along the lines IV—IV of FIG. 1.

FIG. 4 illustrates, in cross section, a second axially positioned radial section of the valve block 1 taken along the lines IV—IV. The needles 31 of the needle valves are illustrated in the same position as those shown in FIG. 3. From the valve chamber of valve 6', passageway 10 leads to axial passageway 11 which is in communication with receptacle 2. The individual radial passageways 7 communicate to the inlet or outlet nozzles 5 through a branch passageway. As indicated by arrows 32 through 36 in the illustrated example, the nozzles at arrows 32 through 35 are used as inlet nozzles while the nozzle at arrow 36 is used as an outlet nozzle. For a water analysis device, for example, a water sample can be conveyed through nozzle 32, a sulfuric acid mixture through nozzle 33, a buffer solution through nozzle 34, etc. Each of these fluids are directed to the receptacle 2 via the valve 6'. If all of the valves except the valves associated with valve needles 31' and 37 are closed and if the receptacle 2 is then provided with pressure via channel 26, the liquid in the receptacle will flow to valve 6' via passageway 11 and to the axis of the spoke passageways via passageway 8'. Thereafter, according to FIG. 3, the liquid will exit the valve head at 36 passing opened needle 37 via associated passageway 7.

It is to be understood that the above described example represents only a preferred form and that variation thereof can be provided. For example, the valve 6 could be elector-magnetically operated valves, whereas the motor 16, indicated in FIG. 1 as being a normal reversable synchronous motor whose motion is recognized through the usage of the perforated disc, could however be a digitally controlled motor. However, it is believed that the type of motor assembly disclosed is preferable since it is both less expensive and eliminates piston pulsation.

It can therefore be seen from the above that this invention provides an improved liquid metering and dosaging device capable of accumulating an admixture of a number of liquids in an intermediate receptacle via a common valve block and a piston controlled burette.

Although the teachings of our invention have herein been discussed with reference to specific theories and embodiments, it is to be understood that these are by way of illustration only and that others may wish to utilize our invention in different designs or applications.

We claim as our invention:

1. In a liquid metering and dispensing device having a liquid receptacle in communication with a valve block and a liquid measurement burette having a motor operated piston in communication with the valve block for conveying a determined amount of liquid to the receptacle through the valve block from the burette through the valve block, the improvement of the valve block including a plurality of inlet nozzles and at least one outlet nozzle, each of the inlet nozzles being selectively communicable with the burette via valve block internal passageways, each of the nozzles having a separate controllable first valve associated therewith for opening and closing communication between the inlet and a passageway from the inlet to the burette, burette to receptacle communicating passageways within the valve block controlled by a second controlled valve for selectively communicating the burette to the receptacle, the receptacle being mounted on the valve block and means sensing movement of the burette piston providing a signal which is usable for control of further piston movement whereby a liquid can be communicated from a selected one of the inlet nozzles to the burette in quantities determined by positioned of the piston in the burette, liquid can be stored in the receptacle from the burette and liquid can be removed from the receptacle through the outlet.

2. The device according to claim 1 wherein the valve block constitutes a distributor head having a plurality of individual valves independently operatable from one another circumferentially spaced around the valve block and spaced from a central axis of the block.

3. The device according to claim 1 including a first passageway in communication with the burette being an axial passageway positioned centrally of the valve block, and a plurality of passageways radiate therefrom in spoke-like fashion communicating to a plurality of first valve chambers, the plurality of first valve chambers each in turn communicating to a nozzle, flow through the first valve chambers from the plurality of passageways being controlled by the first valves.

4. The device according to claim 3 wherein the valve block has a second axial passageway positioned centrally thereof in communication with the receptacle, a second radial passageway communicating the second axial passageway with a second valve chamber, the second valve chamber communicated with the burette associated axial passageway through a third radial passageway, flow through the second valve chamber controlled by the second controlled valve.

5. The device according to claim 4 wherein the receptacle is closed by a cap having a nozzle opening thereto.

6. The device according to claim 5 wherein the individual valves project into the valve block.

7. The device to claim 5 wherein the individual valves are slide valves carried on an exterior of the valve block.

8. The device according to claim 1 wherein the burette piston drive motor is a rotational motor provided with a perforated disc rotating therewith, the perforating disc cooperating with a light optical signal generator and sensor for providing signals for control of movement of the piston, the disc and signal generator and sensor being part of the means sensing movement of the burette piston.

9. In a liquid metering and dispensing device including a valve block having inlet and outlet nozzles leading to valve chambers, the valve chambers communicating to internal passageways, the internal passageways communicating to a piston burette improvement of an intermediate receptacle carried on said valve block, at least one first passageway means from a first valve chamber to the receptacle, a plurality of inlet nozzles, first passageways communicating each of said inlet nozzles to an associated inlet valve chamber, an outlet nozzle, a second passageway from said outlet nozzle to an outlet valve chamber, said valve chambers being each controlled by an actuatable valve, third passageway from each of said inlet valve chambers communicating to a common junction, a fourth passageway open to said burette communicating to the common junction, a second passageway means communicating the burette to the first valve chamber, a third passageway means communicating the first valve chamber to the outlet valve chamber, a means for controlling movement of a piston in the burette and sensing means sensing the position of the piston in the burette.

10. The device of claim 9 wherein the valve block has top and bottom faces and a peripheral face extending axially between said top and bottom faces, the nozzles being arranged circumferentially about the peripheral face, the burette depending from one of the top and bottom faces, the intermediate receptacle depending from the other of the top and bottom faces, the third passageways from the valve chambers to the common junction being substantially radial, the fourth passageway to the burette from the common junction being substantially axial and the first passageway means to the receptacle including a substantially axial portion and a substantially radial portion.

11. The device of claim 10 wherein the valve chambers are positioned adjacent the periphery of the valve block, the valves are needle valves, the needles operating axially, the valves including valve actuators, the valve actuators depending from the valve block and circumferentially spaced from one another.

12. The device of claim 10 wherein the valve chambers are at the periphery of the valve block, the valves being slide valves having axially movable slides at the periphery of the valve block.

13. The device of claim 10 wherein the second passageway means includes the fourth passageway and a radial fifth passageway from the junction to the first valve chamber.

14. The device of claim 13 wherein the third passageway means includes the fifth passageway and a radial sixth passageway from the junction to the outlet valve chamber.

15. The device of claim 9 including means for introducing gas under pressure to the receptacle to force liquid therein to the outlet nozzle.

16. A liquid dosaging device including a moving piston burette, a valve block having inlet and outlet nozzles and internal passageways communicating the inlet nozzle to the burette, the improvement of the valve block having a plurality of inlet nozzles and at least one outlet nozzle, each nozzle having an associated valve chamber controlled by a valve, internal passageways extending from each nozzle associated individual valve chambers to a passageway to the burette, an intermediate receptacle carried by the valve block, a passageway means from the burette to an intermediate receptacle valve chamber and from the intermediate receptacle valve chamber to the intermediate receptacle, passageway means from the intermediate receptacle valve chamber to the outlet nozzle valve chamber, valves in each of the valve chambers controlling flow of liquid through the passageways and passageways means, means controlling movement of the piston in the burette and means sensing position of the piston in the burette whereby a liquid can be communicated from a selected one of the inlet nozzles to the burette in quantities determined by positioned of the piston in the burette, liquid can be stored in the receptacle from the burette and liquid can be removed from the receptacle through the outlet.

* * * * *